US012669104B2

(12) United States Patent
Patil et al.

(10) Patent No.: US 12,669,104 B2
(45) Date of Patent: Jun. 30, 2026

(54) FUEL INJECTOR AND VALVE ASSEMBLY FOR THE SAME

(71) Applicant: Cummins Inc., Columbus, IN (US)

(72) Inventors: Sandip V. Patil, Pune (IN); Dilip Thorat, Pune (IN); Amol Jagannath Bobade, Pune (IN)

(73) Assignee: Cummins Inc., Columbus, IN (US)

( * ) Notice: Subject to any disclaimer, the term of this patent is extended or adjusted under 35 U.S.C. 154(b) by 6 days.

(21) Appl. No.: 18/814,967

(22) Filed: Aug. 26, 2024

(65) Prior Publication Data

US 2025/0084816 A1 Mar. 13, 2025

(30) Foreign Application Priority Data

Sep. 12, 2023 (IN) .............................. 202341061208

(51) Int. Cl.
*F02M 61/20* (2006.01)
*F16K 31/04* (2006.01)

(52) U.S. Cl.
CPC .............. *F02M 61/20* (2013.01); *F16K 31/04* (2013.01); *F02M 2200/50* (2013.01)

(58) Field of Classification Search
CPC .... F02M 61/20; F02M 2200/50; F02M 61/08; F02M 61/165; F16K 31/04
See application file for complete search history.

(56) References Cited

U.S. PATENT DOCUMENTS

| | | | |
|---|---|---|---|
| 4,133,348 A | 1/1979 | Spitz | |
| 4,462,368 A * | 7/1984 | Funada | F02D 41/40 |
| | | | 123/446 |
| 4,564,145 A * | 1/1986 | Takada | F02M 51/0682 |
| | | | 239/585.4 |
| 5,467,797 A | 11/1995 | Seetharaman et al. | |
| 5,681,098 A * | 10/1997 | Ganzel | B60T 8/363 |
| | | | 303/119.2 |
| 6,183,049 B1 | 2/2001 | Oka et al. | |
| 6,364,430 B1 | 4/2002 | Park | |
| 6,488,050 B1 | 12/2002 | Jabcon | |
| 6,679,567 B1 * | 1/2004 | Tackett | B60T 8/3675 |
| | | | 303/119.2 |
| 7,942,348 B2 * | 5/2011 | Reiter | F02M 61/166 |
| | | | 123/470 |
| 11,027,716 B2 | 6/2021 | Lee | |
| 2010/0200790 A1 | 8/2010 | Kratzer | |
| 2018/0128227 A1* | 5/2018 | Laity | F04B 53/02 |
| 2018/0179938 A1* | 6/2018 | Shaull | F01N 3/2892 |
| 2019/0077388 A1 | 3/2019 | Lee | |

FOREIGN PATENT DOCUMENTS

| | | |
|---|---|---|
| ES | 1236184 U | 10/2019 |
| JP | 2010138960 A | 6/2010 |

* cited by examiner

*Primary Examiner* — Syed O Hasan
(74) *Attorney, Agent, or Firm* — Taft, Stettinius & Hollister LLP

(57) ABSTRACT

A fuel injector for fuel is provided. The fuel injector includes a valve assembly with an actuator and a valve coupled to the actuator. The valve includes a valve seat and a plunger radially sealed to the valve seat and movable in the valve seat to selectively open and close an inlet extending through a sidewall of the valve seat.

17 Claims, 4 Drawing Sheets

FUEL INJECTOR AND VALVE ASSEMBLY FOR THE SAME

CROSS-REFERENCE TO RELATED APPLICATION

The present applications claims priority to, and the benefit of the filing date of, India Provisional Application Ser. No. 202341061208 filed on Sep. 12, 2023, which is incorporated herein by reference in its entirety.

FIELD OF THE DISCLOSURE

The present disclosure relates generally to a fuel injector for injection of liquid or gaseous fuel and, more particularly, to a valve assembly for a fuel injector for selectively providing liquid or gaseous fuel flow from the injector.

BACKGROUND

Fuel injectors for internal combustion engines use one or more valves to control the injection of fuel into the combustion chambers or intakes of the engine at precisely controlled quantities, rates, and timing. Fuel injectors are also used to inject a controlled fuel quantity in a supply manifold, such as in a hydrogen fuel cell system. The valve assemblies typically include a solenoid to control the opening and closing of an associated valve in the fuel injector. The size of the solenoid used is based on the forces in which the solenoid is required to overcome to open and close the valve. In addition, the amount of current drawn for operating the solenoid is directly proportional to the size of the solenoid. Valve assemblies that enable solenoid size reduction and lower current draw are desirable for cost savings and operational efficiency. Therefore, there remains a need for the unique apparatuses, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

The present disclosure includes a fuel injector for providing fuel to a prime mover. In an embodiment, the fuel injector includes an elongated injector body defining a longitudinally extending passage therein. The passage extends in a distal direction from a first end to a fuel outlet end of the injector body. The fuel injector also includes a valve assembly mounted to the injector body. The valve assembly includes an actuator and a valve. The valve is selectively opened and closed by the actuator to control fuel flow from the valve to the prime mover.

In an embodiment, the valve includes a valve seat in the passage of the injector body. The valve seat includes an elongated seat body defining a longitudinally extending bore. The seat body further defines an inlet extending radially through the seat body in fluid communication with the bore. The valve also includes a plunger coupled to the actuator and extending into the bore of the seat body of the valve seat. The plunger is longitudinally movable in the bore via the actuator between an open position and a closed position. The plunger includes a first seal extending around the plunger and a second seal extending around the plunger that is spaced longitudinally from the first seal. In the open position, the first seal and the second seal are located proximally of the inlet of the seat body in sealing engagement with the seat body of the valve seat. In the closed position, the first seal is located proximally of the inlet in sealing engagement with the seat body of the valve seat and the second seal is located distally of the inlet in sealing engagement with seat body of the valve seat In an embodiment, a valve assembly is provided for a fuel injector. The valve assembly includes an actuator and a valve. The valve includes a valve seat and a plunger at least partially within the valve seat. The plunger of the valve is coupled to the actuator. The plunger is longitudinally movable by actuator to selectively open an inlet in the valve seat to provide the fuel flow from the fuel injector and to close the inlet in the valve seat to stop the fuel flow from the fuel injector. In the open position, the plunger includes a radial seal that sealingly engages the valve seat at a first location proximal of the inlet and in the closed position the radial seal of the plunger sealing engages the valve seat at a second location distal of the inlet.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
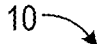
FIG. 1 is a schematic view of a fuel injection system.
Figure 1:
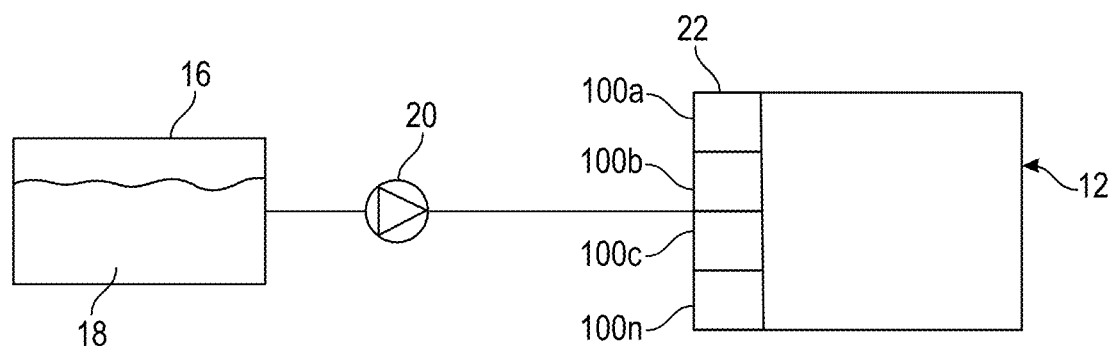

With reference to FIG. 1, there is illustrated a fuel injection system 10 including at least one fuel injector 100a, 100b, 100c . . . 100n for a fuel supply system 22 of a prime mover 12, such as an internal combustion engine or fuel cell. Fuel supply system 22 may include, for example, a combustion chamber, intake manifold, intake plumbing, compressor, fuel mixer, or any other fuel supply system. The at least one fuel injector 100a, 100b, 100c . . . 100n is in fluid communication with a fuel source 16 containing a fuel 18, and a fuel tank/regulator 20 to distribute fuel 18 to the injectors 100a, 100b, 100c . . . 100n. Although multiple fuel injectors are shown schematically in FIG. 1, system 10 may include any number of fuel injectors, including one fuel injector. Pressurized fuel 18 is supplied to each of the fuel injectors 100a, 100b, 100c . . . 100n from the fuel tank/regulator 20. Fuel 18 may be, for example, gaseous, fuel such as hydrogen, propane, natural gas, etc. Fuel 18 may also be liquid fuel such as diesel or gasoline. In the discussion that follows, fuel injectors 100a, 100b, 100c . . . 100n are described with reference to a fuel injector 100, such as shown in FIGS. 2-5.

In an embodiment, the fuel injector 100 provides fuel to a prime mover 12. The fuel injector 100 includes an elongated injector body 102 defining a longitudinally extending passage 104 therein. The passage 104 extends in a distal direction from a first end 106 to an outlet end 108 of the injector body 102. Fuel injector 100 also includes a valve assembly 120 mounted to the injector body 102. The valve assembly 120 includes an actuator 130 and a valve 150. The valve 150 is selectively opened and closed by the actuator 130 to control fuel flow from the valve 150 to the combustion chamber 14.

The valve 150 includes a valve seat 152 in the passage 104 of the injector body 102. The valve seat 152 includes an elongated seat body 154 defining a longitudinally extending bore 156. The seat body 154 further defines a fuel inlet 160 extending radially through the seat body 154 in fluid communication with the bore 156. The valve 150 also includes a plunger 180 coupled to the actuator 130 and extending into the bore 156 of the seat body 154 of the valve seat 152. The plunger 180 is longitudinally movable in the bore 156 via the actuator 130 between an open position and a closed position. The plunger 180 includes a first seal 182 extending around the plunger 180 and a second seal 184 extending around the plunger 180 that is spaced longitudinally from the first seal 182. In the open position, the first seal 182 and the second seal 184 are located proximally of the inlet 160 of the seat body 154 in sealing engagement with the seat body 154 of the valve seat 152. In the closed position the first seal 182 is located proximally of the inlet 160 in sealing engagement with the seat body 154 of the valve seat 152 and the second seal 184 is located distally of the inlet 160 in sealing engagement with seat body 154 of the valve seat 152.

In an embodiment, valve assembly 120 is provided for fuel injector 100. Valve assembly 120 includes actuator 130 and valve 150. Valve 150 includes valve seat 152 and plunger 180 at least partially within the valve seat 152. The plunger 180 of the valve 150 is coupled to the actuator 130. Plunger 180 is longitudinally movable by actuator 130 to selectively open fuel inlet 160 in the valve seat 152 to provide the fuel flow from the fuel injector 100 and to close the inlet 160 in the valve seat 152 to stop the fuel flow from the fuel injector 100. In the open position, the plunger 180 includes radial seal 184 that sealingly engages the valve seat 152 at a first location proximal of the inlet 160 and in the closed position the radial seal 184 of the plunger 180 sealing engages the valve seat 152 at a second location distal of the inlet 160.

Figure 3:
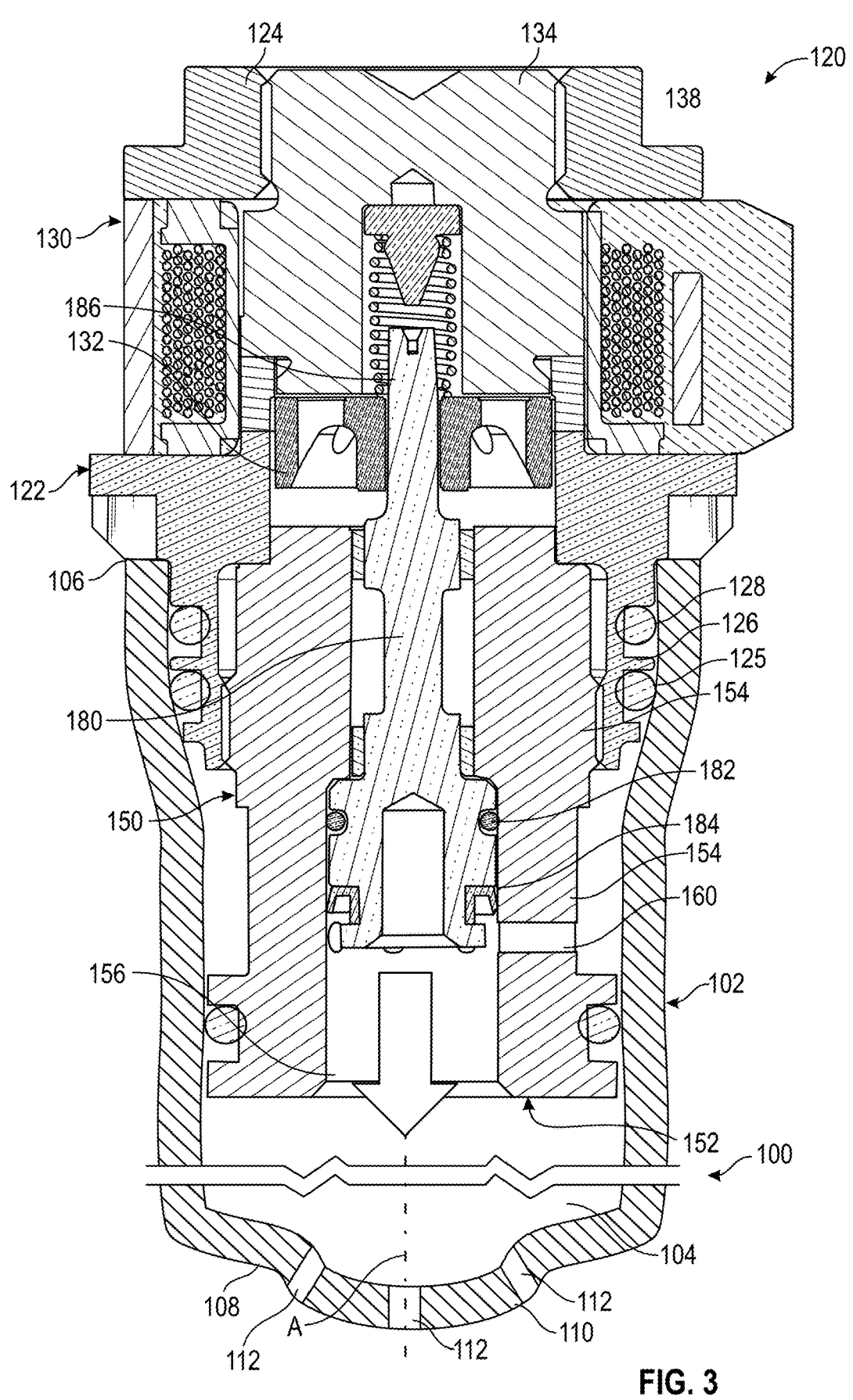
FIG. 3 is another longitudinal section view of the valve assembly of FIG. 2 in an open position.
Figure 4:
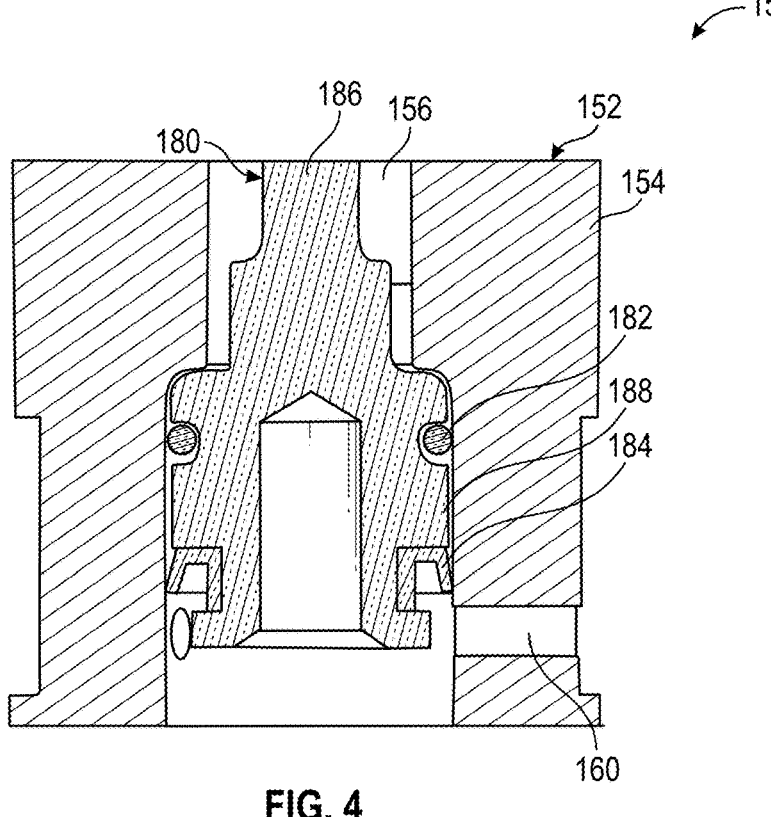
FIG. 4 is an enlarged section view of a portion of the valve assembly of FIG. 2 showing the valve in an open position.
Figure 5:
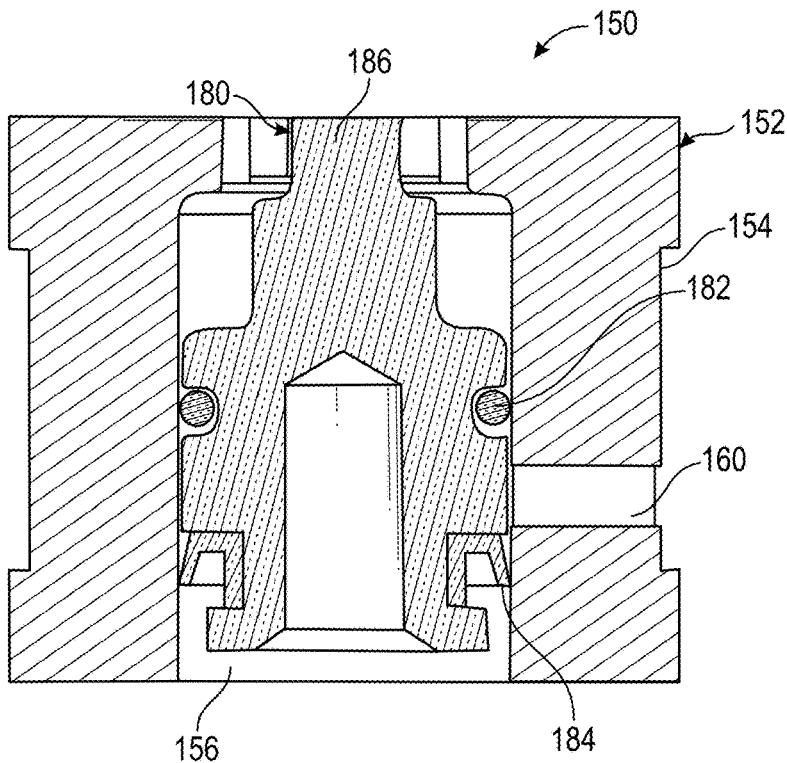
FIG. 5 is an enlarged section view of a portion of the valve assembly of FIG. 2 showing the valve in a closed open position.

The exemplary injector body 102 in FIG. 3 for an embodiment of fuel injector 100 extends along a central longitudinal axis A and includes passage 104 that is defined by the injector body 102 from first 106 to gas outlet end 108. The longitudinally extending passage 104 receives valve assembly 120 at first end 106. Valve assembly 120 includes valve

150 and actuator 130 to control fuel flow from laterally extending fuel inlet 160. In the discussion that follows, "proximal" or "proximally" refer to an axial location or upstream direction toward first end 106 and/or actuator 130, and "distal" or "distally" refers to an axial location or downstream direction toward outlet end 108. Injector body 102 can be comprised of multiple parts that are coupled to one another to form injector body 102, or a single sleeve or component that forms injector body 102.

In the illustrated embodiment, valve assembly 120 includes a flange 122 engaged to first end 106 of injector body 102. Valve assembly 120 also include a fastener 124, such as a nut, to secure actuator 130 to flange 122. Flange 122 includes a distal extension 126 that fits within injector body 102 at first end 106. Valve seat 152 is positioned within and engaged to the distal extension 126.

Flange 122 also includes first and second annular seals 128, 129 positioned around distal extension 126. Seals 128, 129 sealingly engage flange 122 to injector body 102. A feature may also be provided on the injector body 102 and/or flange 122 to facilitate injector mounting to prime mover 12. In an embodiment, a nozzle 110 can be engaged to the outlet end 108 of injector body 102. Nozzle 110 may include one or more holes 112 arranged to divert fuel flow in a desired direction or flow pattern into the fuel supply system 22 and/or prime mover 12. In an embodiment, outlet end 108 can be configured for connection with a manifold arrangement in which fuel is injected directly from injector body 102 into the manifold.

Figure 2:
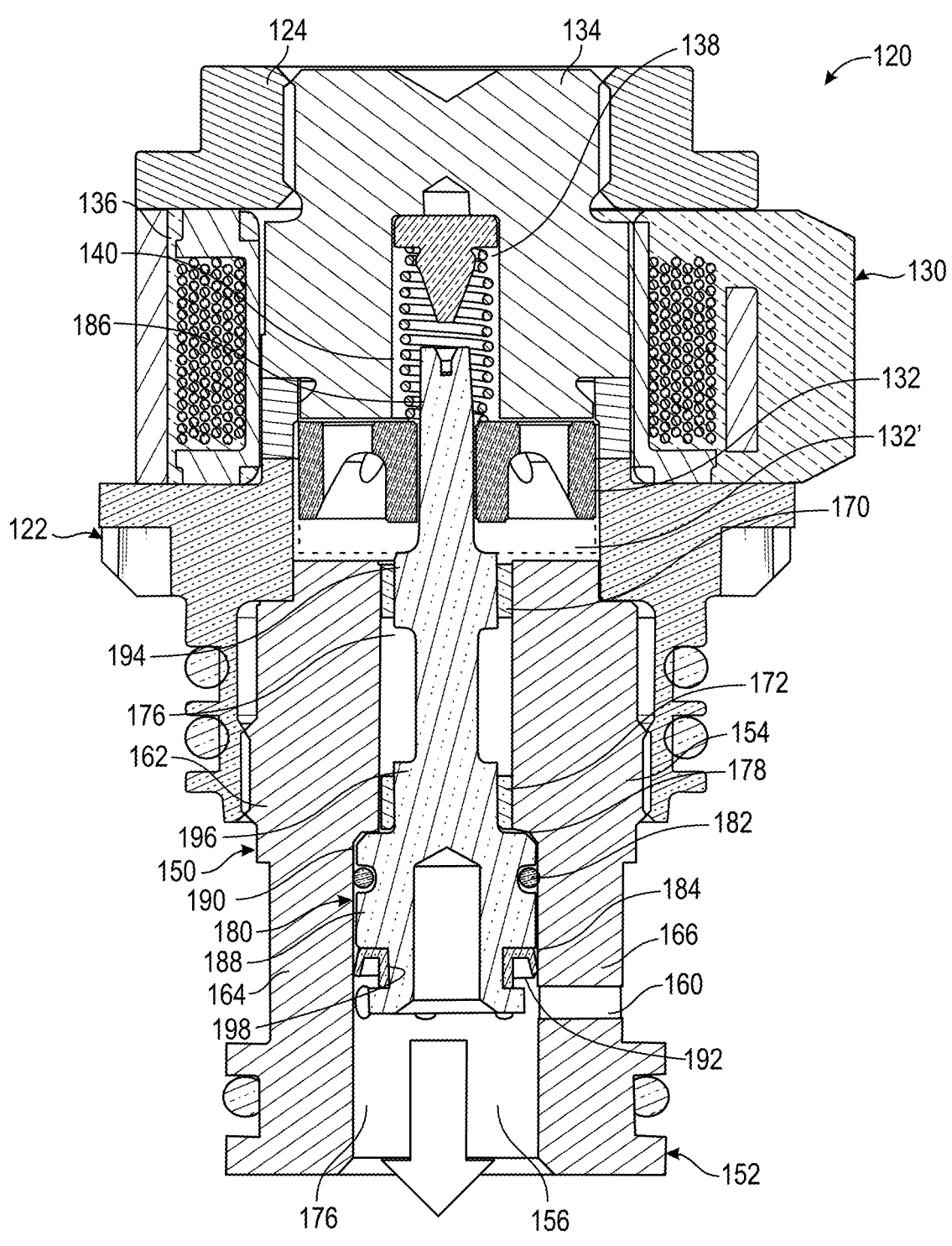
FIG. 2 is a longitudinal section view illustrating an example valve assembly for a fuel injector of the system of FIG. 1, according to an embodiment of the present disclosure.

In an embodiment, actuator 130 is a solenoid operable to longitudinally displace the plunger 180 relative to the seat body 154 in the bore 156 of the valve seat 152 between the open position and the closed position. The solenoid includes an armature 132 coupled to the plunger 180. The solenoid is operable to longitudinally displace the armature 132, and thus the plunger 180, between a first position (indicated by 132') in which the armature 132 contacts the valve seat 152 and a second position in which armature 132 is spaced proximally from the valve seat, as shown in FIG. 2.

In the illustrated embodiment, the actuator 130 includes a stator 134, a coil section 136 around the stator 134, and armature 132 engaged to the stem 186 of the plunger. The armature 132 is located between the stator 134 and the valve seat 152. The stator 134 includes a longitudinally extending blind bore 138 that receives a proximal end of the stem 186 of the plunger 180. The stator 134 includes a spring 140 in the blind bore 138 that contacts the armature 132 and biases the plunger 180 to the closed position. A spring guide 142 in blind bore 138 can be used to assist in guiding and centering spring 140 within blind bore 138.

In an embodiment, plunger 180 includes an elongated cylindrical end member 188 located within the valve seat 152. First seal 182 is an annular or O-ring type seal that extends around end member 188 in sealing engagement with valve seat 152 as the plunger 180 moves between the open and closed positions. Second seal 184 is a radial seal that extends around the end member 188 in sealing engagement with the valve seat 152 as the plunger 180 moves between the open and closed positions. Plunger 180 also includes elongated stem 186 extending proximally from the end member 188 through the valve seat 152 to the actuator 130.

In an embodiment, stem 186 of plunger 180 includes a first radially protruding portion 194 and a second radially protruding portion 196. First radially protruding portion 194 is spaced longitudinally from the second radially protruding portion 196 along stem 186. The first and second radially protruding portions 194, 196 guide, either alone or in conjunctions with plunger guides 170, 172 of valve seat 152, the plunger 180 along the bore 156 of the valve seat 152 as the plunger 180 is moved between the open position and the closed position.

In an embodiment, second seal 184 is a lip seal located in a circumferential groove 198 formed in outer surface 190 of end member 188 that is configured to radially expand or flex to provide radial sealing against an adjacent inner wall surface of valve seat 152. In an embodiment, second seal 184 extends completely around outer surface 190 of the end member 188 of plunger 180. The second seal 184 has an open side 192 that is oriented in the distal direction. In an embodiment, second seal 184 is U-shaped with the opening of the "U" oriented in a distal direction. In an embodiment, the legs of the "U" shape are of unequal length, and the longer leg is position in the groove 198 and the shorter leg is capable of flexing to contact the inner wall surface of valve seat 152.

In an embodiment, when plunger 180 is in a closed position relative to valve seat 152, first seal 182 is located proximally of inlet 160, and second seal 184 is located distally of inlet 160. When plunger 180 is in an open position relative to valve seat 152, both first seal 182 and second seal 184 are located proximally of inlet 160 to allow fuel flow to enter bore 156 and exit valve 150 through the distal opening of bore 156.

In an embodiment, the seat body 154 of the valve seat 152 includes a proximal body portion 162 engaged to the flange 122 in the distal extension 126 of the flange 122. Seat body 154 also includes a distal body portion 164 positioned in and sealingly engaged to the injector body 102 in the passage 104 of the injector body 102. Seat body 154 has an elongated sidewall 166 defining the longitudinally extending bore 156. The inlet 160 extends radially through the sidewall 166 at distal body portion 164, and is in fluid communication with the bore 156 so that fuel flow from the fuel injector 100 is provided through a distal opening of the bore 156 in the valve seat 152.

In an embodiment, inlet 160 extends through the sidewall 166 of seat body 154 orthogonally to the bore 156 and/or longitudinal axis A. Other embodiments include non-orthogonal orientations. Orienting the inlet 160 so fuel flow occurs through sidewall 166 rather through an axially oriented opening reduces or eliminates the axial force generated by pressurized fuel acting on plunger 180 and/or valve seat 152.

The valve seat 152 includes sidewall 166 along seat body 154. Sidewall 166 includes an inner surface defining longitudinal bore 156. Bore 156 includes a proximal portion 174 and a distal portion 176 separated by a lip 178 formed by sidewall 166. The end member 188 of the plunger 180 contacts the lip 178 in the open position of the plunger 180.

In an embodiment, the end member 188 of plunger 180 includes a first portion 200 proximal of the circumferential groove 198. The first portion 200 has a first diameter that corresponds in size to the distal portion 176 of the bore 156. End member 188 of plunger 180 also has a second portion 202 distal of the circumferential groove 198. The second portion 202 has a second diameter that is less than the first diameter so that the second portion 202 is spaced radially inwardly from the inner surface of sidewall 166 of the valve seat 152 at the distal portion 176 of the inner bore 156. This creates a larger flow area for fuel from inlet 160 pass between plunger 180 and the inner surface of seat body 154 when valve 150 is in the open position.

Further written description of a number of example embodiments shall now be provided. In an example embodiment, a fuel injector for providing fuel to a prime mover is provided. The fuel injector includes an elongated injector body and a valve assembly mounted to the injector body. The injector body defines a longitudinally extending passage therein. The passage extends in a distal direction from a first end to a gas outlet end of the injector bod. The valve assembly including an actuator and a valve. The valve is selectively opened and closed by the actuator to control fuel flow from the valve to the prime mover. The valve includes a valve seat in the passage of the injector body. The valve seat includes an elongated seat body defining a longitudinally extending bore, and the seat body further defines an inlet extending radially through the seat body in fluid communication with the bore. The valve also includes a plunger coupled to the actuator that extends into the bore of the seat body of the valve seat. The plunger is longitudinally movable in the bore via the actuator between an open position and a closed position. The plunger includes a first seal extending around the plunger and a second seal extending around the plunger that is spaced longitudinally from the first seal. In the open position, the first seal and the second seal are located proximally of the inlet of the seat body in sealing engagement with the seat body of the valve seat. In the closed position, the first seal is located proximally of the inlet in sealing engagement with the seat body of the valve seat and the second seal is located distally of the inlet in sealing engagement with seat body of the valve seat.

In an example embodiment, the plunger includes an end member that contacts the seat body in the bore of the valve seat, and a stem extending proximally from the end member through the seat body. The stem is coupled to the actuator.

In an example embodiment, the actuator includes a solenoid operable to longitudinally displace the plunger relative to the seat body in the bore of the valve seat between the open position and the closed position.

In an example embodiment, the actuator includes a stator, a coil section around the stator, and an armature engaged to the stem of the plunger. The armature is located between stator and the valve seat.

In an example embodiment, the stator includes a longitudinally extending blind bore that receives a proximal end of the stem of the plunger, and a spring in the blind bore that contacts the armature and biases the plunger to the closed position.

In an example embodiment, the stem includes a first radially protruding portion, and a second radially protruding portion spaced longitudinally from the first radially protruding portion. The first and second radially protruding portions guide the plunger along the bore of the valve seat as the plunger is moved between the open position and the closed position.

In an example embodiment, the valve assembly includes a flange coupled to the injector body, and the actuator and the valve seat are mounted to the flange.

In an example embodiment, the flange includes a distal extension positioned in and sealingly engaged in the passage of the injector body.

In an example embodiment, the seat body of the valve seat includes a proximal body portion engaged to the flange in the distal extension of the flange, and a distal body portion positioned in and sealingly engaged to the injector body in the passage of the injector body.

In an example embodiment, a valve assembly for a fuel injector to selectively provide fuel flow from the fuel injector is provided. The valve assembly includes an actuator and a valve including a valve seat and a plunger. The plunger is at least partially within the valve seat. The plunger of the valve is coupled to the actuator. The plunger is longitudinally movable by the actuator to selectively open an inlet in the valve seat to provide the fuel flow from the fuel injector and to close the inlet in the valve seat to stop the fuel flow from the fuel injector. In the open position, the plunger includes a radial seal that sealingly engages the valve seat at a first location proximal of the inlet and in the closed position, the radial seal of the plunger sealing engages the valve seat at a second location distal of the inlet.

In an example embodiment, the valve seat includes an elongated seat body having a sidewall defining a longitudinal bore extending through the valve seat. The inlet extends radially through the sidewall in fluid communication with the bore. Fuel flow from the fuel injector is provided through a distal opening of the bore in the valve seat.

In an example embodiment, the inlet extends through the seat body orthogonally to the bore.

In an example embodiment, the radial seal is a lip seal that extends around an outer surface of the plunger, the lip seal having an open side that is oriented in a distal direction.

In an example embodiment, the plunger includes: an end member located in the valve seat, the radial seal extending around the end member; and a stem extending proximally from the end member through the valve seat, the stem being coupled to the actuator.

In an example embodiment, the end member of the plunger includes an annular seal extending around the end member at a location spaced proximally of the radial seal. The annular seal is proximal of the inlet in both the open position and the closed position of the plunger.

In an example embodiment, the valve seat includes a sidewall defining a longitudinal bore through the valve seat. The bore includes a proximal portion and a distal portion, the proximal and distal portions separated by a lip of the sidewall. The end member of the plunger contacts the lip in the open position of the plunger.

In an example embodiment, the end member includes a circumferential groove, and the radial seal is located in the circumferential groove.

In an example embodiment, the end member includes a first portion proximal of the circumferential groove, the first portion having a first diameter that corresponds in size to the distal portion of the internal bore. The end member also includes a second portion distal of the circumferential groove. The second portion has a second diameter that is less than the first diameter so that the second portion is spaced radially inwardly from the inner wall of the valve seat at the distal portion of the inner bore.

In an example embodiment, the actuator includes an armature coupled to the plunger, and a solenoid operable to longitudinally displace the armature between a first position in which the armature contacts the valve seat and a second position in which the armature is spaced proximally from the valve seat.

In an example embodiment, the plunger includes an elongated cylindrical end member located within the valve seat. The radial seal extends around the end member in sealing engagement with the valve seat as the plunger moves between the open and closed positions. The plunger also includes an elongated stem extending proximally from the end member through the valve seat to the actuator.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fuel injector for providing fuel to a prime mover, the fuel injector comprising:
an elongated injector body defining a longitudinally extending passage therein, the passage extending in a distal direction from a first end to a gas outlet end of the injector body; and
a valve assembly mounted to the injector body, the valve assembly including an actuator and a valve, wherein the valve is selectively opened and closed by the actuator to control fuel flow from the valve to the prime mover, wherein the valve includes:
a valve seat in the passage of the injector body, the valve seat including an elongated seat body defining a longitudinally extending bore, the seat body further defining an inlet extending radially through the seat body in fluid communication with the bore, the bore having a distal opening for fuel flow from the inlet to exit the valve; and
a plunger coupled to the actuator and extending into the bore of the seat body of the valve seat, wherein the plunger is longitudinally movable in the bore via the actuator between an open position and a closed position, wherein the plunger includes a first seal extending around the plunger and a second seal extending around the plunger that is spaced longitudinally from the first seal, and in the open position the first seal and the second seal are both located proximally of the inlet of the seat body in sealing engagement with the seat body of the valve seat to permit fuel flow from the inlet into the bore and through the distal opening, and in the closed position the first seal is located proximally of the inlet in sealing engagement with the seat body of the valve seat and the second seal is located distally of the inlet in sealing engagement with seat body of the valve seat to prevent fuel flow from the inlet into the bore.

2. The fuel injector of claim 1, wherein the actuator includes a solenoid operable to longitudinally displace the plunger relative to the seat body in the bore of the valve seat between the open position and the closed position.

3. The fuel injector of claim 1, wherein the plunger includes:
an end member that contacts the seat body in the bore of the valve seat; and
a stem extending proximally from the end member through the seat body, the stem being coupled to the actuator.

4. The fuel injector of claim 3, wherein the actuator includes:
a stator;
a coil section around the stator; and
an armature engaged to the stem of the plunger, wherein the armature is located between the stator and the valve seat.

5. The fuel injector of claim 4, wherein the stator includes:

a longitudinally extending blind bore that receives a proximal end of the stem of the plunger; and a spring in the blind bore that contacts the armature and biases the plunger to the closed position.

6. The fuel injector of claim 3, wherein the stem includes:

a first radially protruding portion; and a second radially protruding portion spaced longitudinally from the first radially protruding portion, wherein the first and second radially protruding portions guide the plunger along the bore of the valve seat as the plunger is moved between the open position and the closed position.

7. The fuel injector of claim 1, wherein the second seal is a lip seal that extends around an outer surface of the plunger, the lip seal having an open side that is oriented in a distal direction, the lip seal having legs of unequal length with a longer leg of the lip seal engaged to the plunger and a shorter leg of the lip seal capable of flexing relative to the longer leg to contact the valve seat along the bore.

8. The fuel injector of claim 1, wherein:

the valve assembly includes a flange coupled to the injector body;

the actuator and the valve seat are mounted to the flange; and the flange includes a distal extension positioned in and sealingly engaged in the passage of the injector body.

9. The fuel injector of claim 8, wherein the seat body of the valve seat includes:

a proximal body portion engaged to the flange in the distal extension of the flange; and a distal body portion positioned in and sealingly engaged to the injector body in the passage of the injector body.

10. A valve assembly for a fuel injector to selectively provide fuel flow from the fuel injector, the valve assembly comprising:

an actuator; and a valve including a valve seat and a plunger, the valve seat includes an elongated seat body having a sidewall defining a longitudinal bore extending through the valve seat, the plunger at least partially within a bore of the valve seat, the bore having a distal opening for fuel flow to exit the valve, wherein:

the plunger of the valve is coupled to the actuator;

the plunger is longitudinally movable by the actuator to selectively open an inlet in the valve seat to provide the fuel flow from the fuel injector and to close the inlet in the valve seat to stop the fuel flow from the fuel injector, the inlet extending radially through the sidewall in fluid communication with the bore; and in the open position the plunger includes a radial seal that sealingly engages the valve seat at a first location proximal of the inlet to permit fuel flow from the inlet into the bore and through the distal opening of the bore of the valve seat and in the closed position the radial seal of the plunger sealing engages the valve seat at a second location distal of the inlet to prevent fuel flow from the inlet into the bore;

the radial seal is a lip seal that extends around an outer surface of the plunger, the lip seal having an open side that is oriented in a distal direction, the lip seal having legs of unequal length with a longer leg of the lip seal engaged to the plunger and a shorter leg of the lip seal capable of flexing relative to the longer leg to contact the valve seat;

the end member of the plunger includes an annular seal extending around the end member at a location spaced proximally of the radial seal; and the annular seal is proximal of the inlet in both the open position and the closed position of the plunger.

11. The valve assembly of claim 10, wherein the inlet extends through the seat body orthogonally to the bore.

12. The valve assembly of claim 10, wherein the plunger includes:

an end member located in the valve seat, the radial seal extending around the end member; and a stem extending proximally from the end member through the valve seat, the stem being coupled to the actuator.

13. The valve assembly of claim 12, wherein:

the valve seat includes a sidewall defining a longitudinal bore through the valve seat;

the bore includes a proximal portion and a distal portion, the proximal and distal portions separated by a lip of the sidewall; and the end member of the plunger contacts the lip in the open position of the plunger.

14. The valve assembly of claim 12, wherein:

the end member includes a circumferential groove; and the radial seal is located in the circumferential groove.

15. The valve assembly of claim 14, wherein the end member includes:

a first portion proximal of the circumferential groove, the first portion having a first diameter that corresponds in size to the distal portion of the internal bore; and a second portion distal of the circumferential groove, the second portion having a second diameter that is less than the first diameter so that the second portion is spaced radially inwardly from the inner wall of the valve seat at the distal portion of the inner bore.

16. The valve assembly of claim 10, wherein the actuator includes:

an armature coupled to the plunger; and a solenoid operable to longitudinally displace the armature between a first position in which the armature contacts the valve seat and a second position in which the armature is spaced proximally from the valve seat.

17. The valve assembly of claim 10, wherein the plunger includes:

an elongated cylindrical end member located within the valve seat, the radial seal extending around the end member in sealing engagement with the valve seat as the plunger moves between the open and closed positions; and an elongated stem extending proximally from the end member through the valve seat to the actuator.

* * * * *